United States Patent Office 2,989,447
Patented June 20, 1961

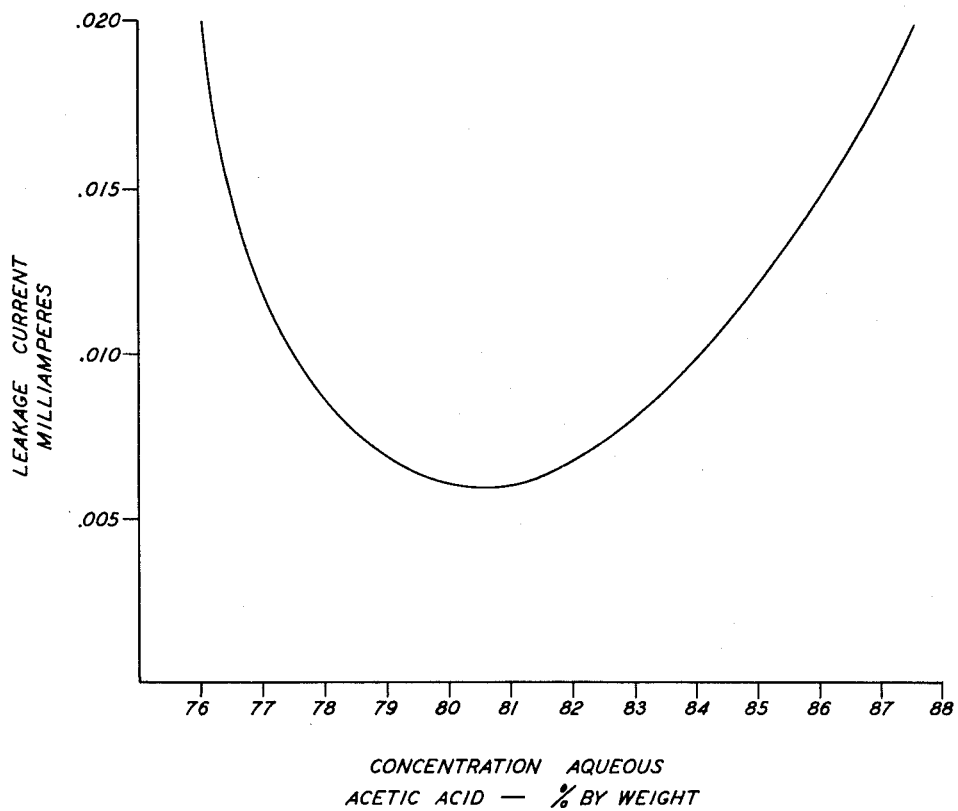

2,989,447
MANUFACTURE OF DRY ELECTROLYTIC DEVICES
Florence S. Power, Short Hills, N.J., assignor to Bell Telephone Laboratories, Incorporated, New York, N.Y., a corporation of New York
Filed Apr. 2, 1958, Ser. No. 725,982
7 Claims. (Cl. 204—42)

This invention relates to improved methods of producing an electrolytic capacitor embodying a solid electrolyte and to capacitors so produced.

The many advantages of electrolytic capacitors are well known, the most notable one being their high capacitance per unit volume. The first types of electrolytic capacitors in commercial use employed a liquid or liquid paste as the electrolyte. As a consequence of the use of such electrolytes, these capacitors suffer from certain defects. Prominent among these defects is the decrease in capacitance and increase in series resistance which obtains when the capacitor is subjected to low temperatures. Another important shortcoming is the degradation in properties with age due to interaction between the liquid electrolyte and the metal oxide dielectric. The use of a liquid electrolyte also necessitates both encasing the capacitor in an impervious container which is unaffected by the electrolyte, and hermetically sealing such container. The requirement of maintaining a hermetic seal renders the capacitor susceptible to damage from sharp changes in temperature and from improper handling with consequent deterioration and loss of the properties which make the capacitor useful.

An electrolytic capacitor employing a solid electrolyte, as described in copending application Serial No. 346,416, makes possible realization of the advantages of the electrolytic type of capacitor while avoiding the drawbacks associated with the use of liquid electrolytes. This solid electrolytic capacitor consists in essence of a porous body, formed under high pressure from particles of a film-forming metal, an anodically formed oxide film covering the entire surface area of the porous body including that of the internal pores and interstices, a solid electrolyte consisting of a semiconductive material in intimate contact with the oxide film, and an electrically conductive layer overlying the semiconductive material.

The essential steps in the method of producing such a capacitor include anodizing the porous body to form a dielectric film on the surface thereof. To this end, the porous body is immersed in an anodizing electrolyte and biased positively with respect to an electrode placed in the electrolyte. This method of film-formation and the effect of parameters such as time, temperature, bias, and composition and concentration of electrolyte are well known in the art. Following this film-forming step, the porous body is washed to remove the anodizing electrolyte from its interstices and pores. Ordinary washing techniques are ineffective to remove the anodizing electrolyte from the microscopically small pores and channels of the porous body. Accordingly, it has been found necessary to boil the body for several successive periods and to rinse with boiling water between each of these periods, or to use other comparably extensive procedures.

In the next step there is produced a layer of solid semiconductive material in intimate contact with the dielectric film. This is conveniently accomplished, as described in the above copending application, by impregnating the porous body with a material such as manganous nitrate which is pyrolytically converted to a solid semiconductive state.

Following the formation of the semiconductive layer, the body is reanodized. Reanodization, which is performed in essentially the same manner as the anodization step, materially reduces the leakage current of the finished capacitor by healing residual imperfections or breaks in the underlying dielectric film. Such imperfections are in part manifestations of the strains induced by the pyrolytic decomposition step. The healing of these imperfections by reanodization is a critical operation. Special attention must be given to the handling and treatment of the body during this step to insure that the semiconductive layer is not depleted or destroyed. Reanodization is accomplished by immersing the body including the layer of semiconductive material in an electrolyte and biasing it positively with respect to an electrode placed in the electrolyte.

Following the reanodizing step, it is common practice to alternately boil and rinse in the manner set forth above to remove the electrolyte from the interstices and pores of the body.

After the reanodizing step, a second layer of manganese dioxide is formed on the body in the manner previously described. This second deposit in addition to increasing the thickness of the manganese dioxide layer insures complete coverage of the dielectric oxide film. A conducting deposit is then applied over the semiconductive layer, for example, by coating the body with graphite. Finally, a metallic electrode coating is applied over the conducting deposit.

Special care must be used in the selection of the electrolyte used in the reanodization step. Clearly, materials which are reducing agents and/or which react with the pyrolytically formed semiconductive oxide layer, cannot be used. High-conductivity electrolytes, such as aqueous solutions of salts of strong bases or acids, are not suitable because the high rate of oxygen formation at the imperfection sites causes the semiconductive material adjacent these sites to flake off and break away. It has been determined that most of the electrolytes which are suitable for use in the anodizing step are not suitable for the reanodizing step. For example, aqueous oxalic acid, which is an excellent anodizing electrolyte cannot be used in re-forming capacitors in which manganese dioxide is the semiconductive material because it reacts with the manganese dioxide and reduces the manganese to lower valence forms.

In accordance with this invention it has been discovered that the use of aqueous acetic acid in the range of concentration of 76 to 86 percent as the reanodizing electrolyte in the production of a solid electrolytic tantalum capacitor employing manganese dioxide as the solid electrolyte, makes possible the production of capacitors of excellent electrical characteristics. The use of acetic acid is particularly advantageous in that the necessary step of removal of the reforming electrolyte from the pores and interstices of the reformed body is facilitated, a simple heating step being all that is required to effectively remove the acetic acid.

Also in accordance with this invention it has been ascertained that a preferred capacitor results from the use of aqueous nitric acid as the anodizing electrolyte followed by reanodizing in aqueous acetic acid as described above.

The invention will be more fully understood from the following detailed description taken in conjunction with the accompanying drawing which is a graph depicting the leakage current of a solid electrolytic capacitor as a function of the concentration of the acetic acid reanodizing electrolyte in the invention process.

With reference more particularly to the graph, there is depicted the variation in the leakage current at an applied voltage of 35 volts of a tantalum solid electrolytic capacitor which is caused by a change in the concentration of the aqueous acetic acid reanodizing electrolyte used in the production of the capacitor in accordance with the present invention. The capacitors whose characteristics are depicted were fabricated from a porous tantalum body in the manner described hereinabove. Aqueous oxalic acid was used as the anodizing electrolyte, aqueous acetic acid was used as the reanodizing electrolyte, and manganous dioxide pyrolytically formed in situ was employed as the solid semiconductive electrolyte.

It is noted that the leakage current is strongly dependent upon the concentration of acetic acid. An incremental increase in the concentration of acetic acid above concentrations of approximately 86 percent results in a large increase in leakage current. The same result obtains from a small decrease in concentration below concentration of approximately 76 percent. For reasons apparent from the graph, the preferred range of operation is between approximately 79 and approximately 82 percent, the optimum concentration being approximately 80.5 percent.

The use of a particular material as the reanodizing electrolyte is entirely unpredictable. Thus many materials which are chemically and/or electrically similar to acetic acid have been found unsuitable for such use. For example, aqueous solutions of manganese nitrate, ammonium nitrate, ammonium bromide, ammonium acetate, citric acid, and oxalic acid were found to be unsuitable for use.

There is no known explanation for the critical dependency of the leakage current on the concentration of acetic acid used as the reanodizing electrolyte. Since the change in electrical conductivity of aqueous acetic acid varies approximately linearly with concentration in the range of approximately 76 to 86 percent, the fact that the leakage current is a minimum at a concentration of approximately 80.5 percent negates the existence of electrical conductivity as a controlling factor in this process.

Reanodizing, employing aqueous acetic acid as the electrolyte in accordance with the present invention, is performed in the same manner as is anodizing, the body being immersed in the reanodizing electrolyte and being biased positively with respect to an electrode also immersed in the electrolyte. The level of bias is somewhat above the voltage at which the capacitor will be operated, and may be the same as that used in the initial anodizing step. Reanodizing is continued until the current passing between the electrode and the body remains substantially constant.

It has been determined that the most favorable results are obtained by maintaining the temperature of the reanodizing electrolyte below 40° C. The preferred temperature range for the electrolyte is 22° C. to 30° C.

Following reanodizing, the acetic acid is removed from the pores and interstices of the tantalum body by heating to an elevated temperature for a time sufficient to volatilize the residual acid. Since a minimum heating period is preferred, it has been found convenient to heat to temperatures in the range of 850° F. to 1000° F., the body being heated until no odor of acetic acid is detectable in the vapors being evolved from the body. A preferred procedure consists of heating to a temperature in the range of from 850° F. to 950° F. for a period of 40 to 75 seconds. It has been found desirable to wet with distilled water prior to the heating step.

The beneficial effect of the use of acetic acid as the reanodizing electrolyte in a process such as described above has been found to be enhanced, if aqueous nitric acid is used as the anodizing electrolyte. The advantages which are directly attributable to such use of nitric acid include higher capacitance per unit volume and lower leakage current. It has been determined that concentrations of nitric acid in the range of from 2/10 to 1 percent are suitable for use, the preferred range being from 0.4 to 0.8 percent.

An important processing advantage gained by the use of nitric acid as the anodizing electrolyte is the fact that, like acetic acid, it too may be removed by a simple heating step. It has been found that heating the anodized body to a temperature in the range of 800° F. to 1000° F. is effective in removing the nitric acid from the interstices and pores of the body. The preferred schedule consists of heating to a temperature in the range of 850° F. to 950° F. for a period in the range of 40 to 75 seconds. In this connection, it has been found that wetting the anodized body with distilled water prior to heating results in more uniform heating and consequently produces a capacitor with greater lifetime.

Thus by use of nitric and acetic acids as the anodizing and reanodizing electrolytes, respectively, the processing of solid electrolytic capacitors of the type under discussion is facilitated by elimination of the boiling water washings. It may be noted that the specific electrolytes disclosed herein are not interchangeable, acetic acid having been found unsuitable for use as an anodizing electrolyte and nitric acid having been found unsuitable for use as a reanodizing electrolyte.

In the invention as set forth above, the procedures of forming the layer of electrolyte (manganese dioxide) and of reanodizing both have been described as consisting of single steps. However in these procedures it has been found desirable to utilize a repetition of steps. For example, it has been found that a succession of impregnations each followed by a pyrolis step results in an improvement of uniformity of the characteristics of capacitors so produced. A succession of reanodizing steps, each followed by the formation of new layers of manganese dioxide is also desirable from the standpoint of uniformity.

Prior to the initial impregnation in the process of forming the manganese dioxide layer, heating the body to drive off water or water vapor which may be present in the pores or interstices of the tantalum body is found to improve the efficiency of the impregnations. Further improvement in the quality of the electrolyte layer may be obtained by wetting the body with distilled water and heating subsequent to the final pyrolysis steps of a succession. This step insures the removal of any volatile products of the pyrolytic decompositions.

Examples of the application of the present invention are set forth below. These are intended merely as illustrations and it is to be appreciated that the processes described may be varied by one skilled in the art without departing from the spirit and scope of the present invention.

The examples are in tabular form for convenience and brevity. Each set of data in the table is to be considered as a separate example, since each set of data was obtained in a separate process. The procedure followed in each of the examples follows:

*Step 1.*—A porous body composed of compressed particles of tantalum was anodized. In Examples 1 through 4, the anodizing electrolyte consisted of 17 percent oxalic acid, 33 percent water and 50 percent ethylene glycol, by weight. In Examples 5 through 8, 0.4 percent aqueous nitric acid by weight was used as the anodizing electrolyte.

*Step 2.*—The anodized body was treated to remove the anodizing electrolyte. In Examples 1 through 4, employing the oxalic acid solution, this removal was effected by four periods of boiling in water of 10 minutes duration each, with a rinse in boiling water between each of these periods. In Examples 5 through 8, wherein nitric acid was used, it was removed by heating the body to approximately 950° F. to approximately 60 seconds after wetting with distilled water.

*Step 3.*—The anodized body was heated to 950° F. for 75 seconds, and then impregnated with an aqueous solution of manganous nitrate which was pyrolytically converted to manganese dioxide by heating to 950° F. for 75 seconds. These steps of impregnation and pyrolysis were repeated twice.

*Step 4.*—The anodized body including the layer of manganese dioxide was reanodized in aqueous acetic acid of concentration of approximately 80 percent.

*Step 5.*—The reanodized body was wet with distilled water and heated to a temperature of approximately 950° F. for approximately 75 seconds to remove the acetic acid.

*Step 6.*—The reanodized body, free of acetic acid, was treated in the manner of step 3. Steps 4, 5, and 3 were then repeated twice.

*Step 7.*—An aqueous dispersion of graphite was applied over the surface of the body followed by the application of a solder coating over the graphite.

| Example Number | Anodization and Reanodization Bias (Volts) | Capacitance (Microfarads) | Applied Voltage (Volts) | Leakage Current at Applied Voltage (Milliamperes) |
|---|---|---|---|---|
| 1 | 100 | 20.8 | 35 | .0045 |
| 2 | 100 | 20.5 | 35 | .0051 |
| 3 | 55 | 36.0 | 20 | .0059 |
| 4 | 55 | 36.2 | 20 | .0055 |
| 5 | 100 | 24.1 | 35 | .0037 |
| 6 | 100 | 23.0 | 35 | .0038 |
| 7 | 55 | 42.7 | 20 | .0030 |
| 8 | 55 | 44.6 | 20 | .0026 |

What is claimed is:

1. The method of reanodizing a porous tantalum body which includes a layer of manganese dioxide in intimate contact with the anodized surface thereof comprising the steps of immersing said body in aqueous acetic acid of 76 to 86 percent concentration by weight, biasing said body anodically so that an anodizing current flows therethrough, and maintaining said bias until the said anodizing current attains a substantially constant value, removing said body from said acetic acid and heating said body to a temperature and for a time sufficient to volatilize the residual acetic acid contained therein whereby said residual acetic acid is substantially eliminated from said body.

2. The method of claim 1 in which the concentration of said acetic acid is in the range of approximately 80 to 82 percent.

3. A device produced in accordance with the method of claim 1.

4. The method of producing a solid electrolytic capacitor which comprises the steps of immersing a porous tantalum body into aqueous nitric acid of concentration in the range of $1/10$ to 1 percent by weight, biasing said body positive with respect to an electrode immersed in said nitric acid thereby forming an oxide film over the entire surface area of said body, removing said body from said nitric acid and heating said body to a temperature and for a time sufficient to volatilize the residual nitric acid contained therein whereby the said residual nitric acid is substantially eliminated from said body, pyrolytically forming a layer of manganese dioxide in intimate contact with said oxide film, immersing said body including said layer of manganese dioxide in aqueous acetic acid of concentration in the range of 76 to 86 percent by weight, biasing said body anodically so that an anodizing current flows therethrough, and maintaining said bias until the said anodizing current attains a substantially constant value, and removing said body from said acetic acid and heating said body to a temperature and for a time sufficient to volatilize the residual acetic acid contained therein whereby the said residual acetic acid is substantially eliminated from said body.

5. The method of claim 4 in which the concentration of said nitric acid is in the range of 0.3 to 0.5 percent by weight.

6. A device produced in accordance with the method of claim 4.

7. The method of claim 5 in which the concentration of said acetic acid is in the range of 80 to 82 percent by weight.

References Cited in the file of this patent

UNITED STATES PATENTS

| 672,913 | Pollak | Apr. 30, 1901 |
| 1,678,824 | Ruben | July 31, 1928 |
| 2,871,425 | Burnham | Jan. 27, 1959 |
| 2,930,951 | Burger et al. | Mar. 29, 1960 |